(12) United States Patent
Partridge et al.

(10) Patent No.: US 10,094,480 B2
(45) Date of Patent: Oct. 9, 2018

(54) ROTARY MULTI-PORT VALVE

(71) Applicants: Charles C. Partridge, Houston, TX (US); Sergey Shatalov, Moscow (RU)

(72) Inventors: Charles C. Partridge, Houston, TX (US); Sergey Shatalov, Moscow (RU)

( * ) Notice: Subject to any disclaimer, the term of this patent is extended or adjusted under 35 U.S.C. 154(b) by 0 days.

(21) Appl. No.: 15/414,458

(22) Filed: Jan. 24, 2017

(65) Prior Publication Data

US 2018/0209551 A1 Jul. 26, 2018

(51) Int. Cl.
*F16K 11/074* (2006.01)
*F16K 11/085* (2006.01)

(52) U.S. Cl.
CPC ......... *F16K 11/085* (2013.01); *F16K 11/0856* (2013.01); *Y10T 137/86501* (2015.04); *Y10T 137/86533* (2015.04); *Y10T 137/86863* (2015.04)

(58) Field of Classification Search
CPC ........ F16K 11/085; F16K 5/162; F16K 5/204; Y10T 137/86501; E21B 34/02
USPC .... 251/160, 161; 166/86.3, 90.1, 91.1, 95.1, 166/97.1, 84.3, 386
See application file for complete search history.

(56) References Cited

U.S. PATENT DOCUMENTS

| | | | | |
|---|---|---|---|---|
| 2,991,803 A | * | 7/1961 | Michie | B65G 53/56 137/625.11 |
| 4,192,482 A | * | 3/1980 | Goldman | F01L 1/32 251/56 |
| 4,440,320 A | * | 4/1984 | Wernicke | B29B 7/7438 222/145.1 |
| 5,613,511 A | * | 3/1997 | Andersen | B05B 1/1636 134/166 R |
| 5,848,610 A | * | 12/1998 | Livernash | F16K 11/072 137/625.11 |
| 6,345,645 B1 | * | 2/2002 | Kenna | F16K 11/085 137/624.13 |
| 7,059,349 B2 | * | 6/2006 | Breda | E03C 1/023 137/625.11 |
| 8,899,269 B2 | * | 12/2014 | Seim | F16K 11/085 137/454.6 |
| 9,228,664 B2 | * | 1/2016 | Partridge | F16K 11/0856 |

* cited by examiner

*Primary Examiner* — Craig Schneider
*Assistant Examiner* — Kevin Barss
(74) *Attorney, Agent, or Firm* — James L. Jackson

(57) ABSTRACT

A rotary multi-port valve having a valve body defining a valve chamber and having a plurality of inlet flow ports each having a stationary seat member therein and having a discharge port. A flow diverter member is supported by a valve stem and a tubular trunnion for rotation within the valve chamber and has a diverter chamber. A piston is hydraulically moveable within the diverter chamber and has driving connection with a diverter valve member is linearly moveable for sealing engagement with a selected stationary seat member. The diverter valve member is selectively retracted to a position completely within the valve chamber to permit selective rotation of the flow diverter member within the valve body to an aligned position with any of the inlet ports of the valve body.

18 Claims, 11 Drawing Sheets

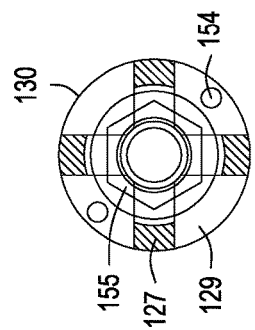
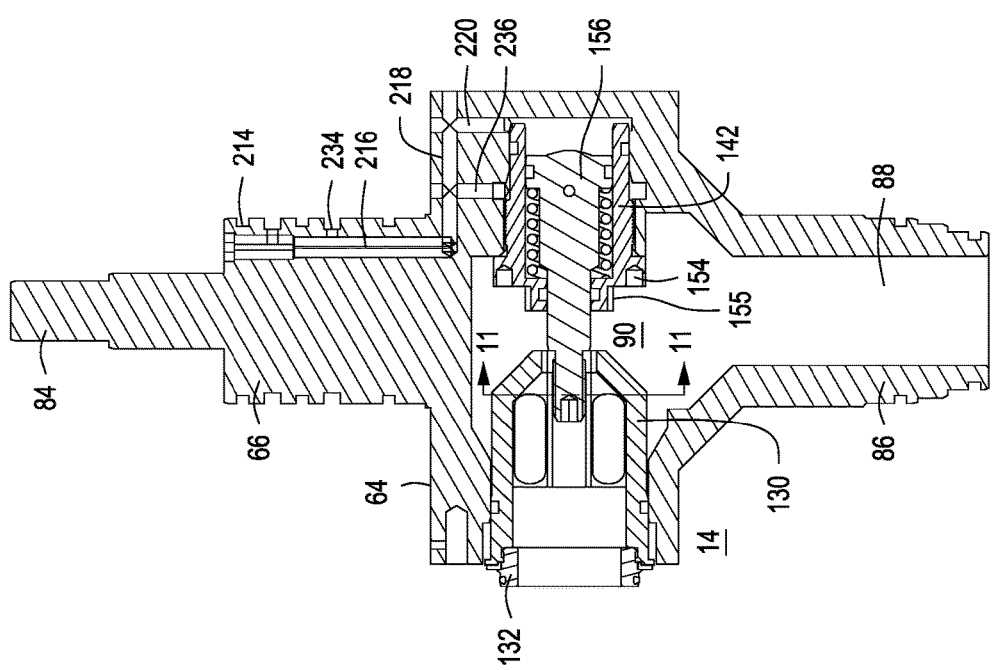
FIG. 11
FIG. 10

ROTARY MULTI-PORT VALVE

RELATED PATENT

This application generally concerns the subject matter of U.S. Pat. No. 9,228,664 B2, for Rotary Multi-Port Valve, issued on Jan. 5, 2016 to Charles C. Partridge, Kenton Chickering, III and Bela Vaczi.

BACKGROUND OF THE INVENTION

Field of the Invention

The present invention relates generally to multi-port diverter valves which may have a single input flow of fluid and multiple output flows of fluid or in the alternative may have multiple input flows of fluid and a single output fluid flow. More particularly, the present invention concerns a rotary multi-port diverter valve mechanism having a port selector piston member that is linearly moveable within a passage of a rotary diverter member to permit selective positioning of the port selector piston member achieve selective flow from a selected one of a plurality of inlet flow ports through the valve and to a single discharge flow port to a discharge flow line.

Description of the Prior Art

Many different types of rotary diverter valves have been developed over the years and are presently used in a wide variety of fluid handling environments. In particular, flow streams from a number of petroleum wells can be conducted through a multi-port valve so that the fluid of each of the flow streams can be measured, collected or conducted to a single discharge flow line to a processing system. U.S. Pat. Nos. 6,196,266 and 7,059,349 present diverting valves of this general nature. In the petroleum industry, U.S. Pat. No. 6,648,070 shows an insert valve for use as a choke valve. U.S. Pat. No. 5,316,042 discloses a multi-way valve mechanism. The latest improvement in rotary multi-port valves is now represented by the aforementioned U.S. Pat. No. 9,228,664 and incorporates a hydraulically energized rotary diverter mechanism having a port selector piston and valve assembly that is moved linearly to an actuated position establishing flow controlling relationship with a selected inlet port.

SUMMARY OF THE INVENTION

It is a principal feature of the present invention to provide a novel rotary multi-port valve having an internal port selector piston member and diverter valve member that can be removed and repaired or replaced without having to remove the rotary flow selecting diverter mechanism from the valve body of the flow diverter system and without requiring removal of the multi-port valve from a flow line system.

It is also a feature of this invention to provide a novel rotary multi-port valve mechanism having a diverter valve member that is moveable within an internal chamber of a rotary diverter member and which is moveable to a retracted position within the internal valve chamber so that nose seals of the diverter valve member cannot contact any internal valve body structure during rotation, thus protecting the nose seals and other diverter valve components from being damaged or otherwise degraded during diverter rotation. This feature ensures that the seals cannot be degraded or otherwise damaged by sand and other particulate that is entrained within the flowing fluid from the active inlet port of the valve body, thus ensuring long service life of the nose seals.

It is another feature of the present invention to provide a novel rotary multi-port valve having a hydraulic system that accomplishes movement of an internal port selector piston member to its active sealing position in sealing engagement with a valve seat of a selected inlet port of the rotary multi-port valve and employs the energy of hydraulic pressure, diverter chamber pressure or spring force to return the port selector piston to a retracted position permitting rotation of a rotary diverter member for alignment with any of a number of selected positions for communication with one of a selected number of flow ports as desired.

It is also a feature of the present invention to utilize a novel double-acting piston return system including a hydraulic piston return feature using diverter chamber pressure for piston return actuation and to employ the force of a return spring or spring package to augment piston return or to serve for piston return actuation in the event line pressure should be insufficient to develop needed piston return force.

It is another feature of the present invention to provide a novel rotary multi-port valve mechanism having a plurality of inlet ports each having a stationary seat member and being selectively supplied with fluid flow from a number of pressurized liquid and gas sources, such as petroleum producing wells and incorporating a flow diverter member having a port selector piston member. The port selector piston member is hydraulically actuated to an active condition and can be returned to its retracted position by the hydraulic force of valve chamber pressure or by the force of a return spring or by the force of diverter chamber pressure, i.e., line pressure, acting on a second pressure responsive area of the port selector piston member. The valve actuating piston member can also be returned to its retracted position by a hydraulic actuator, which applies pressure to the opposite or return side of the piston, while the piston chamber on the actuating side of the piston is depressurized.

It is another feature of the present invention to provide a novel rotary multi-port valve mechanism having a unique leak detection system enabling any seal leakage to be detected and measured even while the valve mechanism is in flow controlling operation.

Briefly, the various features and benefits of the present invention are realized by providing a multi-port valve mechanism having a valve body defining a valve chamber and having a single discharge flow port and a plurality of inlet flow ports. A rotary flow diverter member is mounted for rotation within the valve chamber and defines a diverter chamber within which a port selector piston member and a diverter valve member are moveable by hydraulic pressure. The diverter valve member is connected with and is moveable within a chamber of the diverter member by the port selector piston member. The rotary flow diverter member has a diverter stem and a tubular trunnion member each providing for rotary support of the rotary diverter member within the valve chamber. The tubular trunnion of the rotary flow diverter member defines a discharge flow passage in communication with the discharge flow port of the valve body.

The rotary diverter member defines a transversely oriented internal piston receptacle within which is moveably positioned a port selector piston member that has a retracted position permitting rotation of the rotary diverter member for alignment of a sealing end portion of the port selector piston member with a selected flow port. The port selector piston member has an active port selecting and sealing position being moved linearly by hydraulic pressure into sealing engagement with a substantially stationary valve seat of a selected one of a plurality of sealing ports of the valve mechanism. For linear movement of the port selector piston member to its active sealing position with respect to a selected inlet port seat member the valve mechanism is provided with a hydraulic system that is selectively operated to provide the pressure responsive force that is needed for linear movement of the port selector piston to its sealing position and to its return or retracted position. During this hydraulically energized linear movement a piston return spring of the port selector piston member is loaded with spring energy, if a return spring is indeed provided. For spring return the port selector piston member to its inactive position the pressure of the hydraulic fluid is decreased, permitting the stored spring energy of the piston return spring to move the port selector piston member to its inactive retracted position.

The port selector piston member defines a second pressure responsive area that is exposed to diverter valve chamber pressure and is normally inactive when the piston member is being maintained at its active position by the force of hydraulic pressure. The second pressure responsive area is defined by a reduced diameter cylindrical section of the port selector piston member that is engaged by an internal annular seal member that is supported by an internal seal groove of the piston housing. When the hydraulic pressure is depleted, such as by closing a hydraulic control valve and venting the hydraulic pressure acting on the port selector piston, the pressure of line fluid within the diverter valve chamber, acting on the second pressure responsive area, will provide sufficient force to return the piston member to its retracted position. It should be noted that line pressure acting on the second pressure responsive area of the port selector piston member is always present when the ported diverter valve member is positioned in sealing relation with a stationary seat member of a selected inlet port of the valve body. This line pressure actuated piston return force is overcome when the port selector piston member is hydraulically actuated for movement of the diverter valve member to its sealing position with the stationary seat member of a selected inlet port. With the diverter valve member retracted to a protected position within the valve chamber of the diverter member, the diverter member is rotatable, with the valve chamber under pressure, until the diverter valve member is aligned with another of the multiple inlet ports of the valve body.

The valve body also defines a pressure test and piston removal port that is normally closed by a test plug. The stationary valve seats within all of the inlet ports can also be extracted from the valve body after the bonnet closure member has been removed from the valve body and the rotary diverter member has been removed from the valve chamber. The housing for the piston member can be unthreaded from the piston housing receptacle of the rotary diverter member for removal from the valve body through the test and service port for replacement or repair as desired. These features permit the valve body of the multi-port valve mechanism to remain connected with multiple fluid handling pipelines or manifold systems during repair or replacement of the port selector piston assembly. The test plug is also provided with a bleed port that is normally closed by a bleed plug member having a bleed valve. By opening the bleed valve of the test plug member the test flow chamber may be depressurized. With the valve chamber pressurized and with the sealing end of the port selector piston member in sealing engagement with the test plug, any seal leakage that may be occurring between the test flow chamber and the valve chamber will be evidenced at the test plug opening. This feature is generally known in the industry as "double block and bleed testing" and is employed for determination of seal integrity.

The valve body defines a plurality of incrementally spaced detent recesses that are engaged by a spring urged ball detent member thus providing for ease of port alignment as the rotary diverter member is rotated by means of a diverter stem that extends upwardly through a bonnet member that form a closure for the valve chamber of the valve body. The ball detent mechanism provides easily recognizable rotary position stops for the rotary flow diverter member to facilitate ease of valve usage.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a top plan view showing a rotary multi-port valve that embodies the principles of the present invention;

FIG. 2 is a side elevation view showing the rotary multi-port valve of FIG. 1 and emphasizing the port arrangement thereof;

FIG. 3 is a rear view of the valve body of the rotary multi-port valve mechanism;

FIG. 4 is a section view taken along line 4-4 of FIG. 2 showing the retracted positions of the port selector piston member and linearly movable diverter valve member to permit rotation of the flow diverter member within the valve body;

FIG. 4A is a section view showing the upper and intermediate portions of the rotary multi-port valve of FIGS. 1-4 in detail, with the port selector piston and diverter valve members being shown at the active flow controlling positions thereof;

FIG. 4B is a section view showing the lower portion of the rotary multi-port valve mechanism of FIGS. 1-4

FIG. 5 is a partial section view taken horizontally along line 5-5 of FIG. 4, showing two inlet ports of the valve body and showing the de-energized condition of the port selector piston to permit rotary movement of the port selector rotor for port selection;

FIG. 6 is a partial section view taken along line 5-5 of FIG. 5 and being enlarged to show the retracted position of the diverter valve member in greater detail;

FIG. 7 is also an enlarged partial section view taken along line 5-5 of FIG. 4 and showing the port selector piston member for controlling extension and retraction movement of the diverter valve member and further showing a mechanism for adjusting the relative positions of the port selector piston member and diverter valve member;

FIG. 8 is a partial elevation view showing the rotary diverter member and illustrating the hydraulic supply passages through which hydraulic or pneumatic pressure is active to control extension and retraction movement of the port selector piston member;

FIG. 9 is a multiple view showing aspects of the hydraulic or pneumatic passage system for piston actuation;

FIG. 10 is a longitudinal section view showing the port selector piston member and the diverter valve member at the extension or selected positions thereof and emphasizing the hydraulic fluid passages for selectively achieving piston actuation and piston retraction; and FIG. 11 is a section view taken along line 11-11 of FIG. 10 showing portions of the diverter valve member and the piston housing and port selector piston member.

DETAILED DESCRIPTION OF PREFERRED EMBODIMENT

Figure 1:
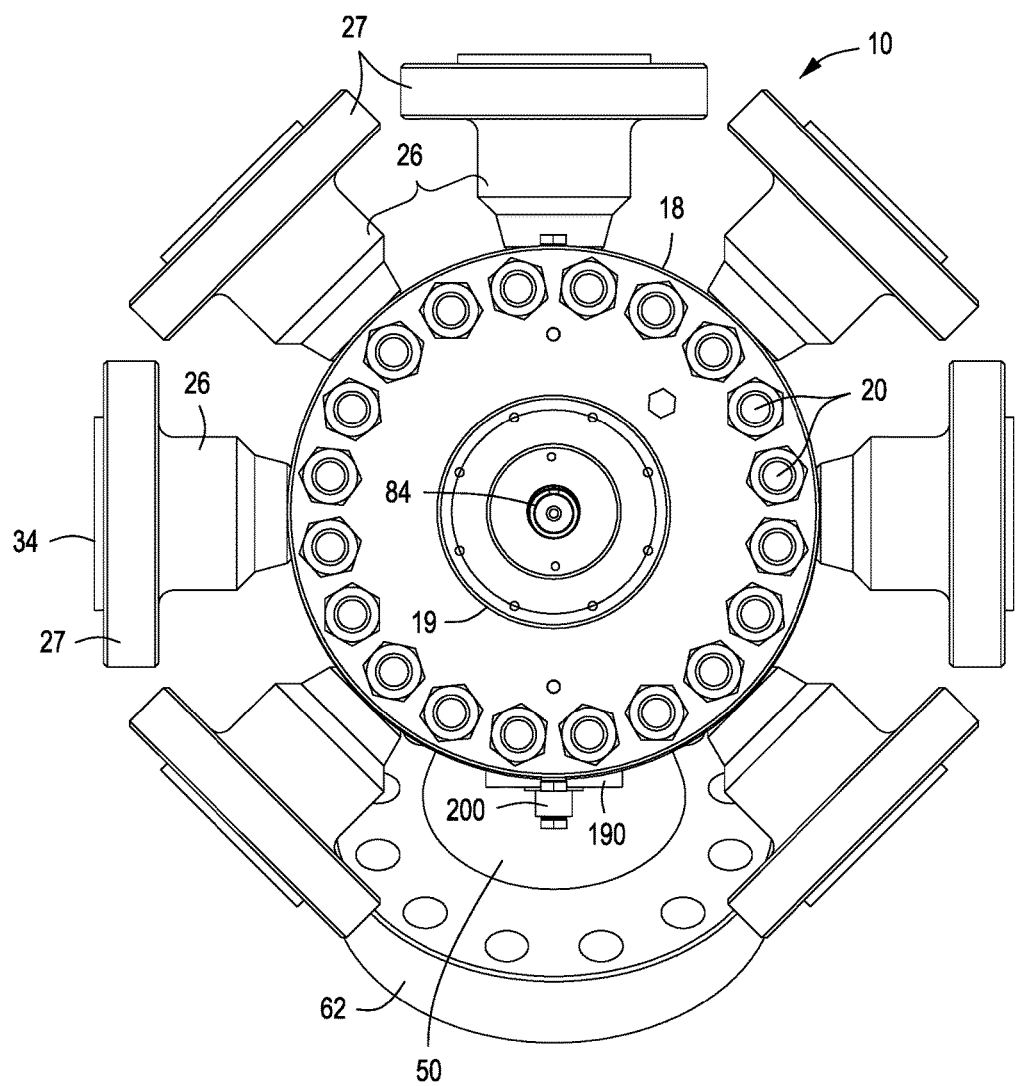
Figure 2:
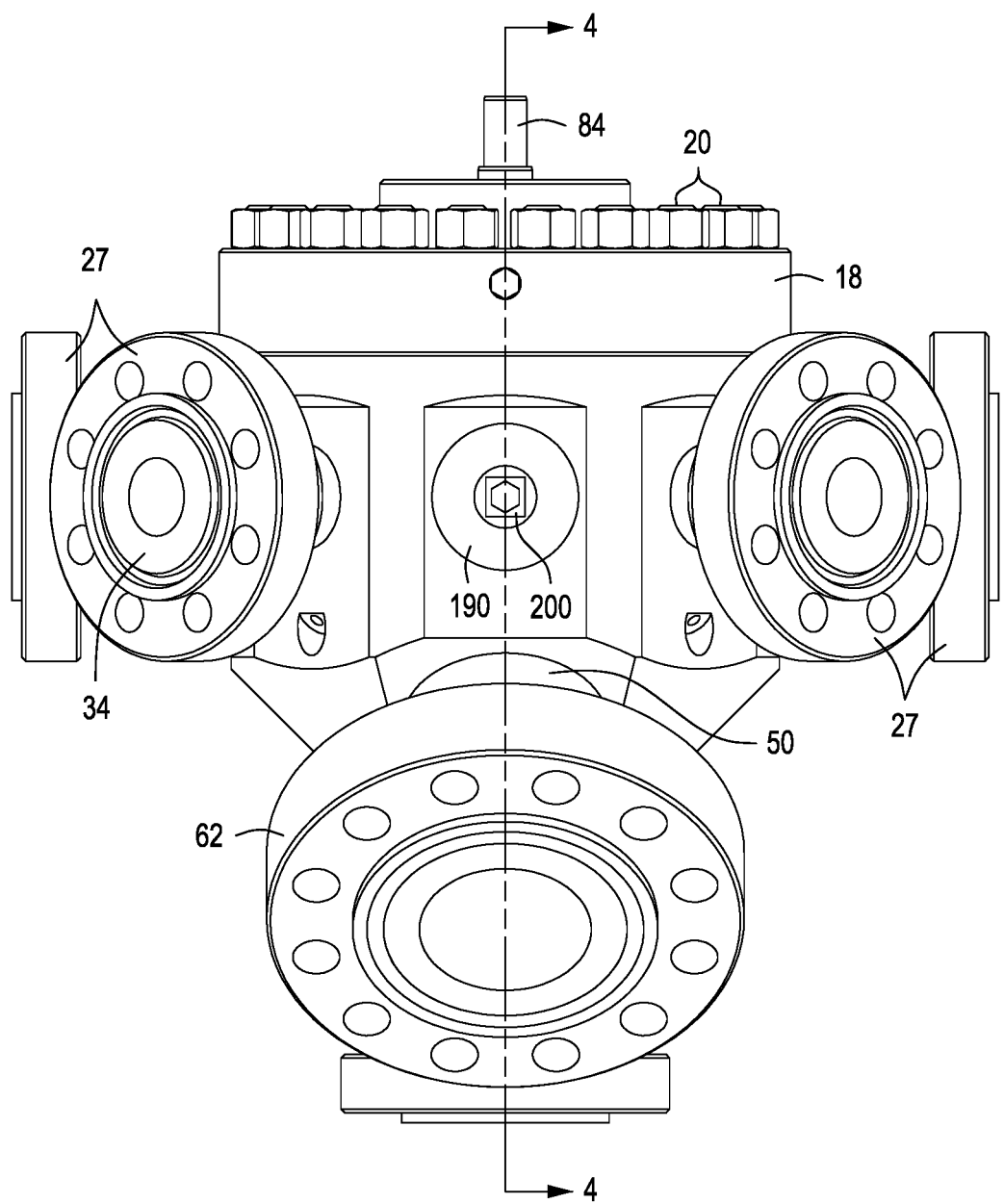
Figure 3:
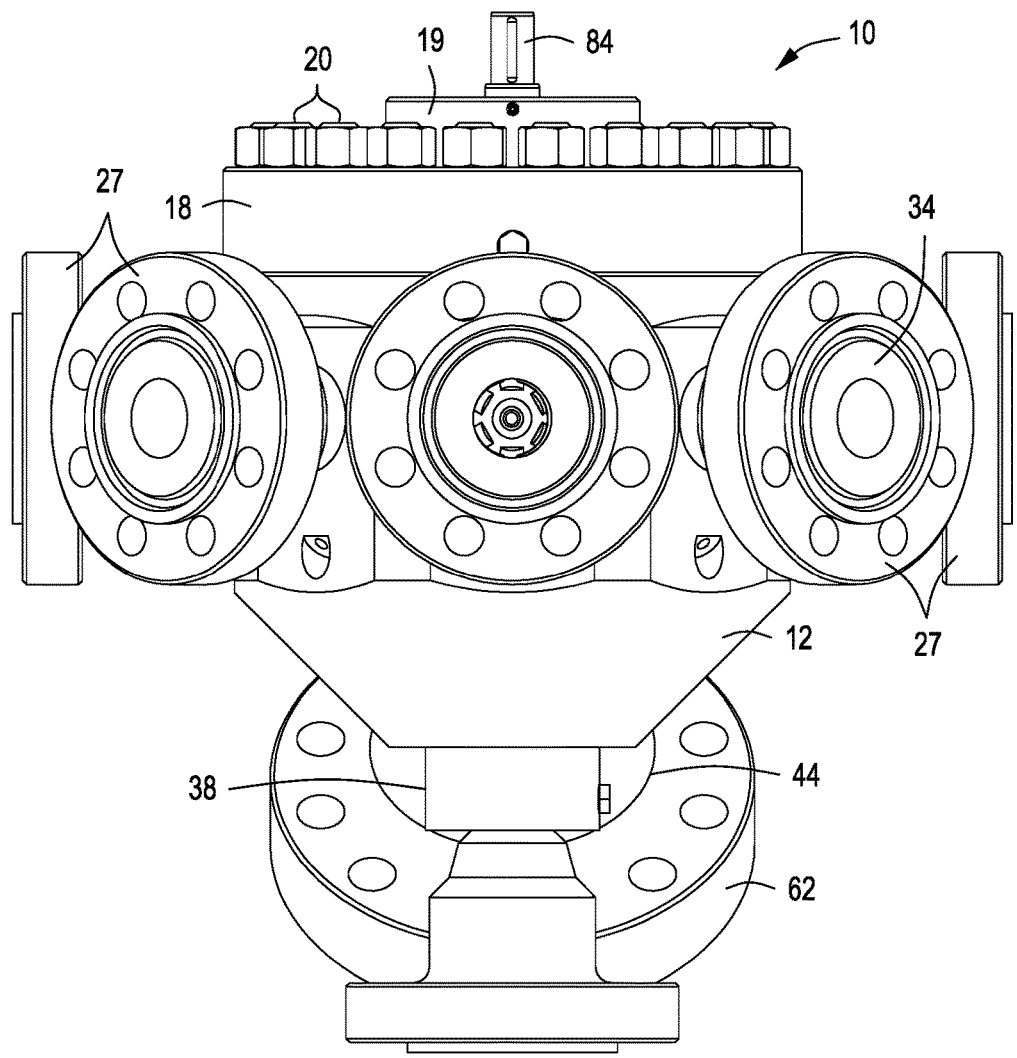

Referring now to the drawings and first to FIGS. 1-3, a rotary multi-port valve embodying the principles of the present invention is shown generally at 10 and has a valve body 12 that defines a valve or diverter chamber 14. The valve body defines a valve chamber opening 16 that is closed by a bonnet member 18 having an upwardly projecting annular rim 19. The bonnet member is secured to the valve body by a circular array of stud and nut retainer assemblies 20, retainer bolts or any other suitable bonnet retainer devices. The outer peripheral portion of the bonnet member is sealed to the valve body by an annular bonnet seal member 22 that is contained within an annular seal recess within the upper end portion of the valve body 12.

Figure 4:
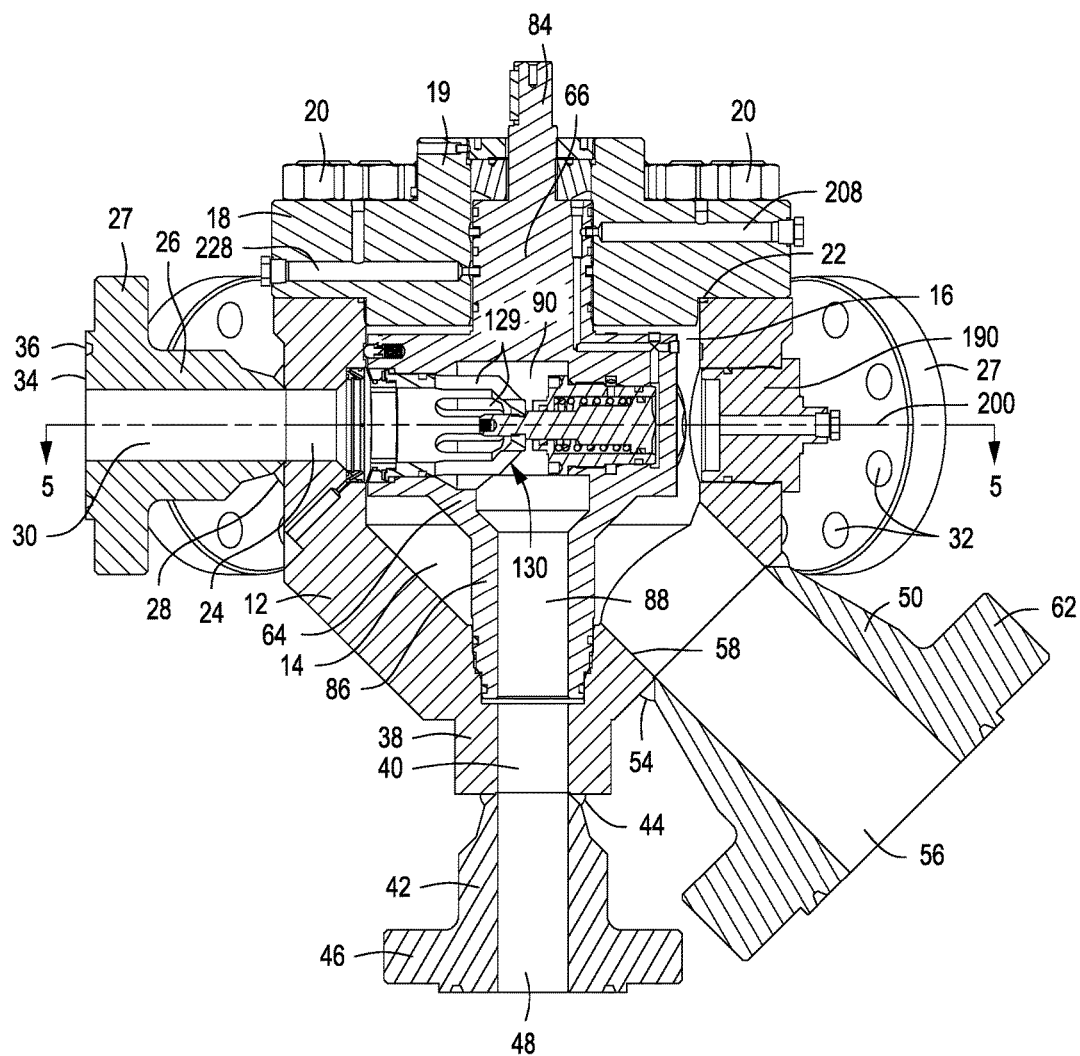
Figure 4A:
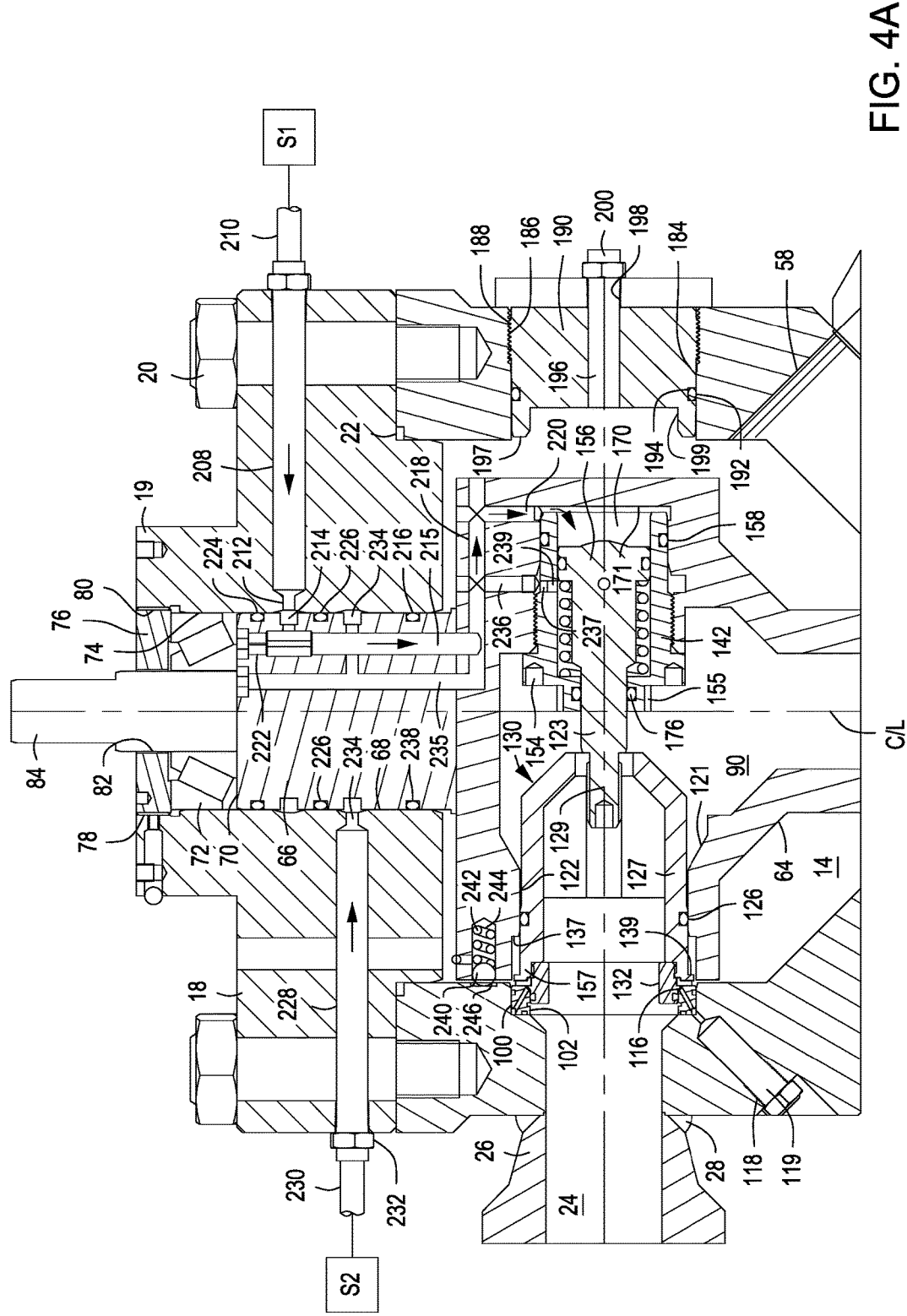
Figure 4B:
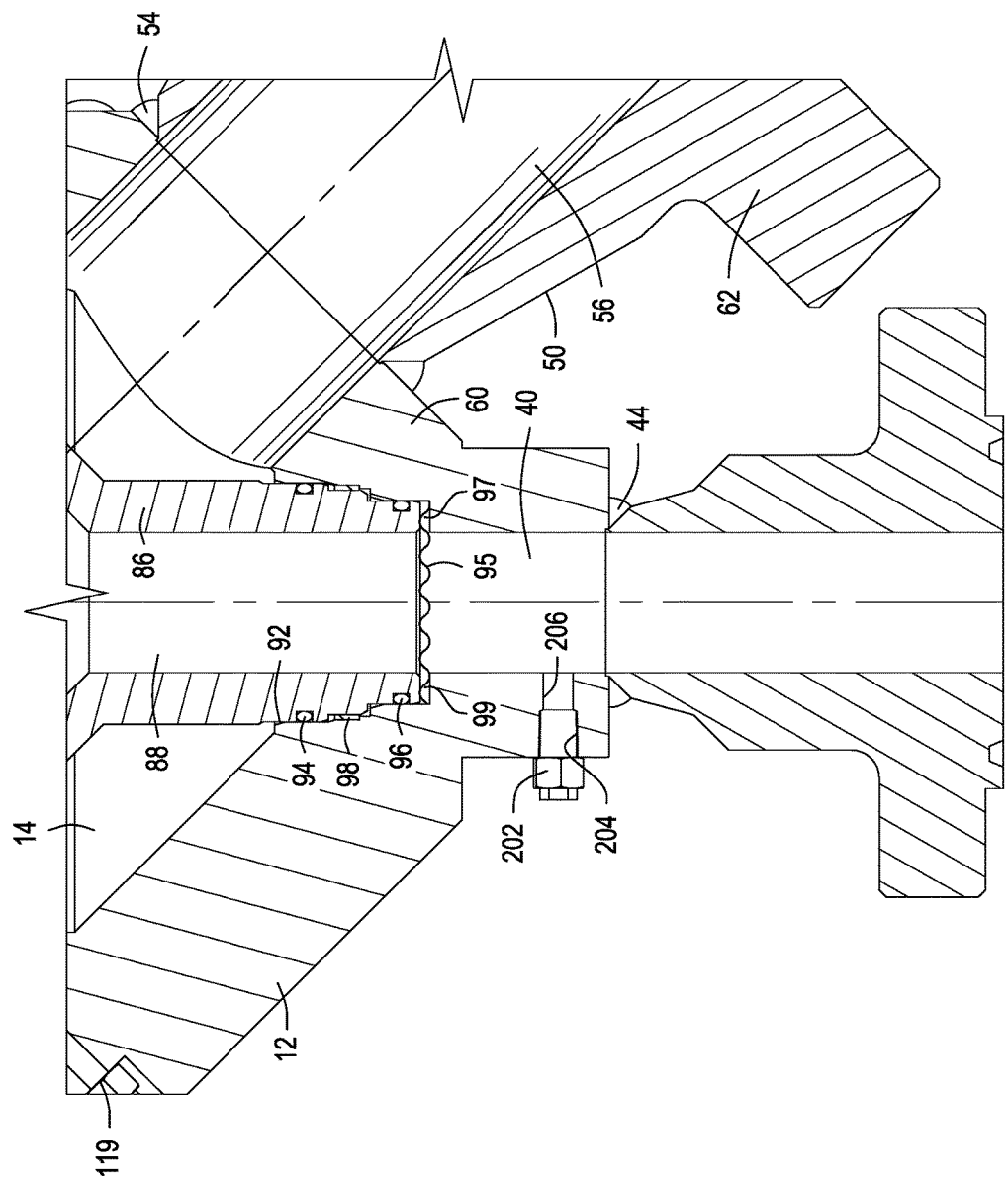

As shown in FIGS. 1-4, and particularly in the detailed section views of FIGS. 4A and 4B, the valve body 12 defines a plurality of inlet ports, one being shown at 24 in the section view of FIG. 3, permitting pressurized fluid from a number of different sources to enter the valve or diverter chamber 14. For example, pressurized fluid such as crude oil, natural gas and water, generally referred to as well fluid, is conducted by flow lines from several petroleum producing wells to the rotary multi-port valve 10. A plurality of inlet connection fittings 26, each having mounting flanges 27 are mounted to the valve body, such as by means of weld connections 28 and define a flow passage 30 that is positioned in alignment with the a respective one of the flow ports 24 of the valve body 12. Each of the connection flanges is provided with a plurality of bolt holes 32 through which bolts or stud and bolt assemblies extend for connecting the flanges 26 with corresponding connection flanges of an inlet flow line extending from a well or other source to the rotary multi-port valve 10. Each of the connection flanges 26 is provided with an annular sealing face 34 having a circular seal groove 36 permitting pressure containing sealed connection of a fluid inlet flow line with one of the connection flange 26 of the valve body. The valve body 12 defines a downwardly facing discharge section 38 having a discharge flow passage 40 through which the fluid flow from a selected fluid inlet passage is directed as discussed in detail below. A connection fitting 42 is mounted to the valve body 12 by welding 44 and provides a pipe connection flange 46 that is adapted for bolted connection with a discharge flow line. The connection fitting 42 defines a flow passage 48 through which discharge fluid flow is conducted to the flow passage of a discharge flow line. It is to be borne in mind however, that the valve body 12 can be provided with other flow line connection devices or structure without departing from the spirit and scope of the present invention; thus it is not intended that the flanged connection structure that is shown and described be considered limiting of this invention.

A valve chamber discharge fitting 50 is secured to the valve body 12 by a weld connection 54 and defines a flow passage 56 that is in communication with a flow port 58 in the wall structure 60 of the valve body. The flow port 58 and the flow passage 56 provide for controlled venting of the valve chamber as needed and provide a means for testing a number of seals for potential leakage. The discharge fitting 50 serves to discharge fluid flow that enters the valve chamber 14 from the inlet ports. The valve chamber discharge fitting 50 is preferably a flange type fitting, having a connection flange 62 for connection with a discharge flow line. However, it should be borne in mind that other types of pipe connection fittings may be employed without departing from the spirit and scope of the present invention.

As shown in FIGS. 4 and 4A, a rotary diverter member 64 is positioned for rotation within the valve chamber 14 of the valve body 12 and has a valve stem 66 that projects upwardly through a valve stem passage 68 of the bonnet member 18. The valve stem 66 defines an upper generally planar shoulder surface 70 that provides support for a bearing assembly 72 that is contained within a bearing receptacle 74 that is defined in part by the valve stem passage 68 of the valve body 12. A circular bearing retainer plate member 76 has a threaded outer periphery 78 that is received by an internally threaded section 80 within the upper end portion of the valve stem passage. The circular bearing retainer plate member 76 defines a central opening 82 through which projects a diverter actuator stem portion 84 of the valve stem 66. A suitable rotary actuator mechanism, not shown, is attached in driving relation with the diverter actuator stem 84 for selectively actuating, i.e., rotating the rotary diverter member 64 to one of its flow controlling positions within the valve chamber 14 as explained in detail below.

The diverter member 64 defines a downwardly projecting tubular trunnion member 86 having a flow passage 88 that is in communication with a diverter chamber 90 within the valve body 12. The tubular trunnion member 86 and the valve stem 66 are rotatable about a common vertically oriented axis of rotation C/L. The tubular trunnion member 86 is received within a trunnion receptacle 92 of the valve body and is sealed with respect to an internal cylindrical wall surface of the trunnion receptacle by spaced annular seal members 94 and 96 that are contained within respective annular external seal grooves of the tubular trunnion member 86. A circular bushing or bearing member 98 located within a circular bearing receptacle in a lower portion of the valve body provides rotational support for the tubular trunnion member within the trunnion receptacle of the valve body 12. A wave spring 95 engages the lower end 97 of the trunnion member and also has reacting engagement with an annular upwardly facing shoulder 99 within the trunnion receptacle 92 to ensure the diverter member 64 has freedom of movement within the valve chamber 14.

The valve body 12, at each of the plurality of inlet ports of the valve body, one being shown at 24 in FIG. 4, defines a circular seat recess 100 within which is located a circular stationary seat ring member 102 that is substantially fixed within the seat recess by the frictional retention of a press-fit or secured in stationary position within the seat recess by any other suitable means for retention. The seat ring 102 is sealed with respect to cylindrical and planar wall surfaces 104 and 106 of the seat recess by seal members 108 and 110 that are retained within seal grooves of the stationary circular seat member 102.

A plurality of pressure detection passages 112 extend diagonally through the seat rings 102 from a circular pressure detection groove 114 to a truncated annular corner 116 of the stationary seat ring, defining an annular space or chamber 116. The pressure detection passages serve as a part of a leak detection system to sense the pressure rise between the seals 108 and 110 to ensure the integrity of the seals. As shown in FIGS. 4 and 4A the valve body structure is provided with a receptacle 118 within which a pressure sensor 119 is received to verify the pressure rise in the annular corner space or chamber 116. Note, the pressure will rise in the annular corner space or chamber 116 when a pressure sensor is used. The pressure will always rise if the seat and piston seals are undamaged, but the pressure rise can be sensed if the valve mechanism uses pressure sensors only. The circular seat member 102 is provided with in internal annular groove 101 that permits a grapple device to be employed to grip the seat ring member 102 and extract it from its seat recess in the event seat replacement is necessary. However, replacement of the seat ring member 102 can be accomplished only after the diverter member 64 has been removed from the valve body to permit access to the seat rings via the bonnet opening.

Within the rotary diverter member 64 the diverter valve chamber 90 is defined by an internal wall surface 121 having an internal generally cylindrical restricted wall surface section that serves as an internal cylindrical valve sealing wall 122. The sealing wall 122 is engaged by an external annular sealing member or ring 126 that is contained within an annular seal groove of a substantially cylindrical portion 127 of a linearly moveable diverter valve member shown generally at 130. The seal member 126 is shown as a simple O-ring seal, but it is to be borne in mind that the seal can be composed of any combination of materials and seal design to ensure positive sealing under a wide range of fluid pressure conditions. This diverter valve sealing arrangement permits the rotary diverter member 64 to maintain a sealed relationship with the valve body 12 while the diverter member 130 is moved linearly between its active position in sealed relation with the valve seat 102 and its retracted position shown in FIGS. 5 and 6. At its retracted condition, the diverter valve member 130 is shown to be retracted to a position completely within the valve chamber 14, clear of the valve body structure, thus permitting the rotary diverter member 64 to be rotated within the valve body to position the valve or flow diverter member 130 for selective flow controlling alignment with any of the flow ports of the valve body. This feature eliminates wear of the seals of the internal diverter seat or seal retainer member 132 as the seals of the seat or seal retainer member is retracted to a protected position within the diverter chamber 90 as the diverter valve member 130 is moved to its retracted position by return actuation of the piston member 156. When the diverter valve is in this retracted and protected position the nose seals of the valve member 130 are prevented from contact with the internal structure of valve body during rotation of the diverter member 64 and are also protected from damage by sand and other particulate that is entrained within the fluid, typically well fluid produced from oil and gas wells being controlled by the valve. The generally cylindrical wall structure 127 of the diverter valve member 130 defines a plurality of fluid flow openings 120 so that fluid flow from the selected inlet port 24 and inlet passage 30 will enter the diverter chamber 90 via the fluid flow openings 120. Flow will then proceed through the discharge passage 88 of the tubular trunnion member 86 and through the discharge port 40 of the valve body and the discharge passage 48 of the discharge fitting 42 for transport via a pipeline to a location for further processing.

Figure 5:
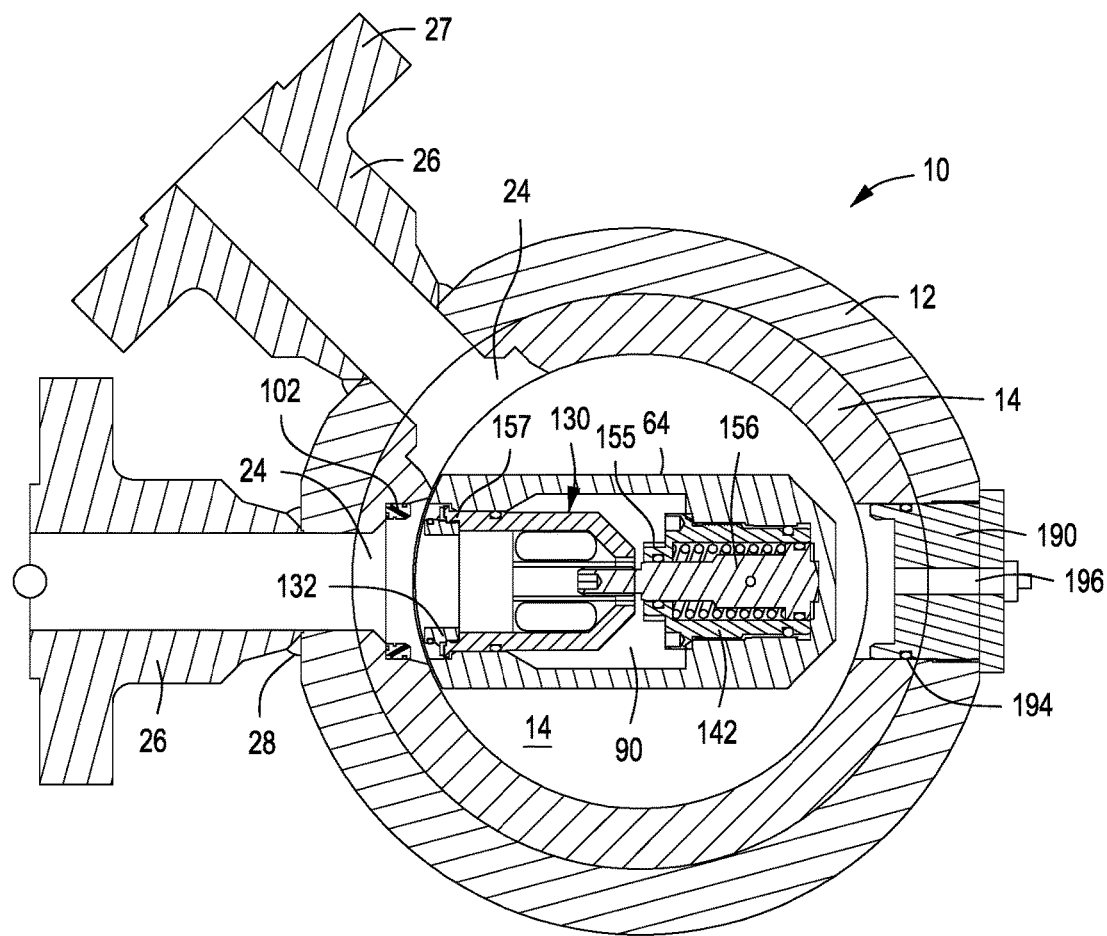
Figure 6:
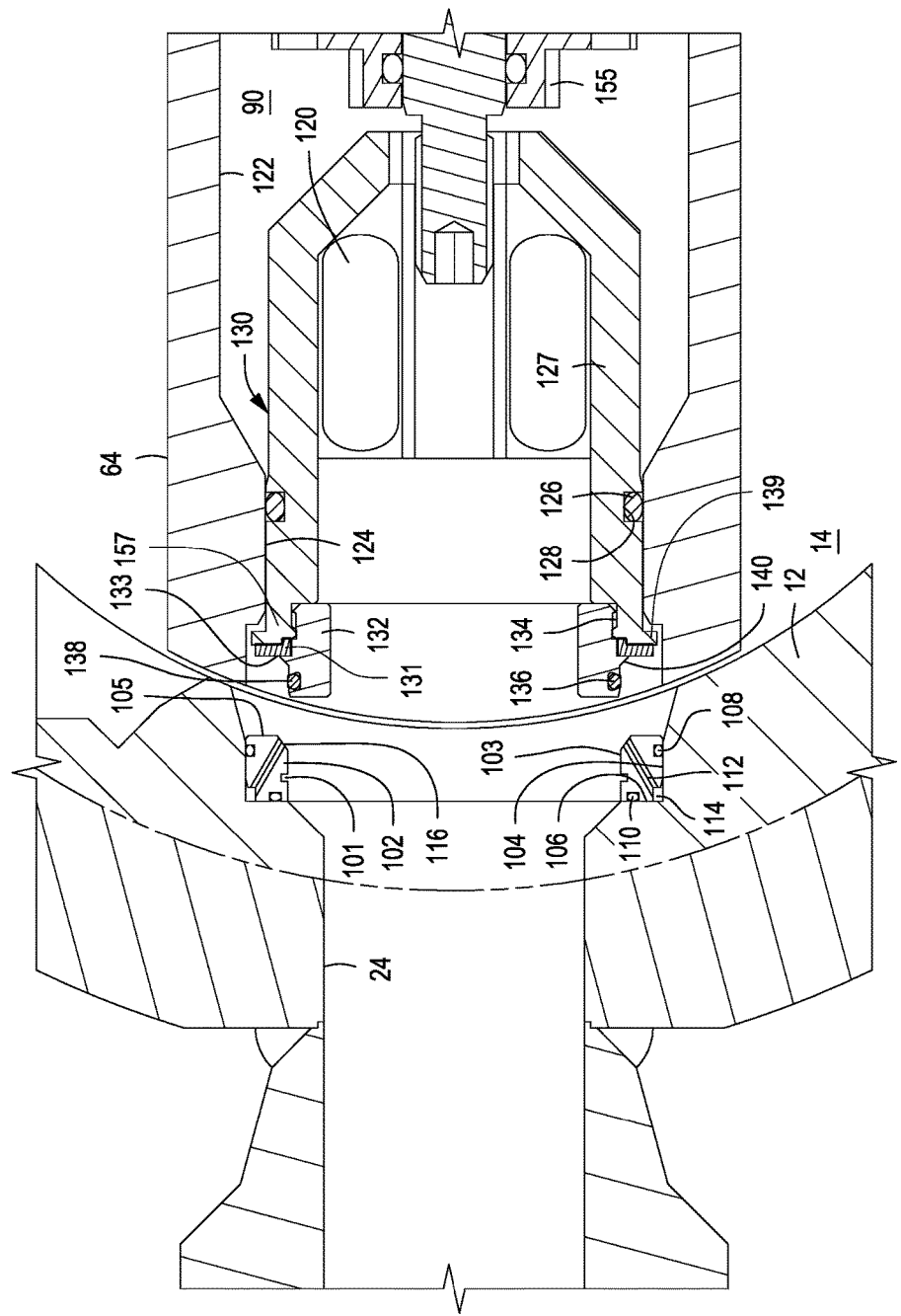
Figure 7:
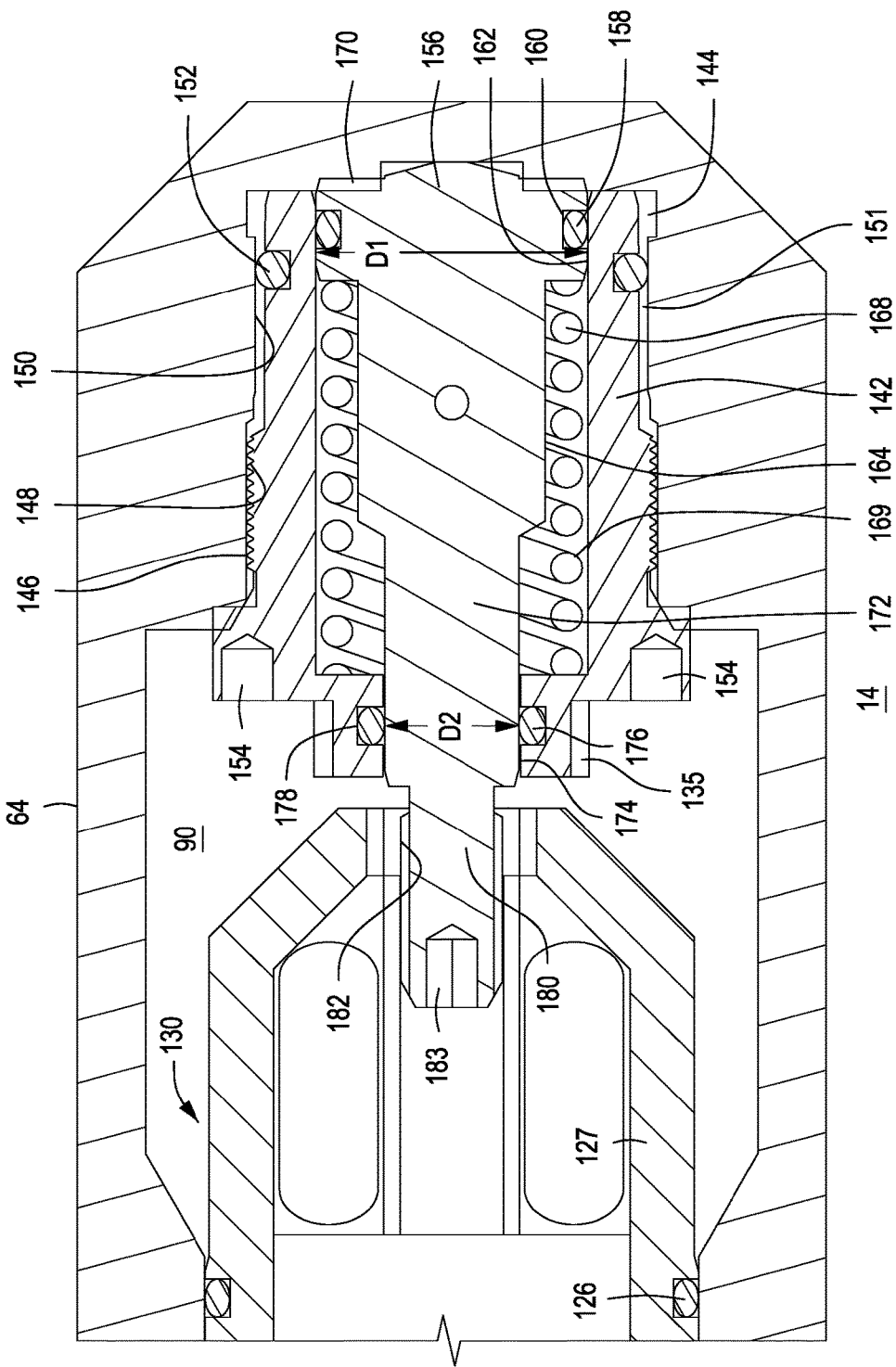

To permit rotation of the diverter member for alignment of the sealing end of the diverter valve member with one of the fluid inlet ports, such as shown in FIG. 4, it is necessary that the diverter valve member 130 be moved to a retracted position wholly within the valve chamber 14, as shown in FIGS. 5-7. As shown in FIG. 5 and the enlarged partial section view of FIG. 7 an actuator housing 142 is retained within an actuator receptacle 144 by engagement of an externally threaded section 146 of the actuator housing with an internally threaded section 148 of the diverter member 64. The actuator housing 142 is sealed with respect to an internal cylindrical sealing surface 150 within the flow diverter member 64 by an annular housing seal member 152. The housing seal member 152 also serves to separate the hydraulic or pneumatic chamber 170 from the discharge flow chamber 40, thus separating the hydraulically supplied piston actuator chambers. For actuating the piston member 156 from its retracted position shown in FIG. 7 to its extended position shown in FIG. 10 a hydraulic actuator, not shown, injects hydraulic pressure into chamber 170 via the hydraulic supply passage 220 while simultaneously permitting venting of the hydraulic chamber 151 via hydraulic passage 236. Note that the hydraulic chamber 151 also serves as a spring return chamber if a piston return spring 168 is provided. For hydraulically actuated return of the piston member 156 the hydraulic actuator is reversed, injecting hydraulic pressure into the chamber 151 via the hydraulic passage 238 and venting hydraulic pressure from chamber 170 via the hydraulic passage 220. A number of spanner holes 154 in an end portion of the actuator housing permit a spanner wrench or other suitable tool to engage the actuator housing and rotate it within the actuator receptacle 144 to thread it into place or unthread it for removal as needed. A wrench receiving projection 155 of external hexagonal configuration projects toward the open end or circular nose 157 of the diverter valve member 130. The wrench receiving projection can receive a hexagonal wrench, such as a wrench socket member, for rotating the actuator housing 142 to thread it into the internal piston housing thread 148 or to unthread and remove the actuator housing from the diverter member such as during repair operations.

A port selector piston member 156 is positioned for movement within the actuator housing 142 and supports a first piston seal 158 within an external annular seal groove 160. The first piston seal establishes sealing engagement with an internal cylindrical sealing surface 162 within the actuator housing and establishes a seal diameter D1 that is subject to hydraulic or pneumatic piston actuating pressure from a fluid power source. The piston member 156 has a first reduced diameter portion 164 defining a spring chamber 166 within the actuator housing, within which is located a piston return spring 168 that is located within a spring chamber 169 as shown in FIG. 7. The piston return spring 168 is preferably subjected to initial compression during its installation, though such initial compression is not critical to piston operation. As the piston member 156 is moved to the left as shown in FIG. 7 by fluid pressure within a hydraulic or pneumatic chamber 170, as explained in detail below, the piston return spring will be subjected to additional compression. When piston actuating pressure in chamber 170 is depleted by bleeding fluid pressure from chamber 170 to a suitable reservoir, the return spring 168 will urge the piston member 156 to the inactive or retracted position shown in FIG. 7.

The piston member 156 has another reduced diameter section 172 defining a cylindrical sealing surface 174 which is engaged by a second annular piston seal member 176 contained within an annular internal seal groove 178 of the actuator housing 142 and establishes a second seal diameter D2 that is subject to line pressure within the diverter valve chamber 90 that is supplied from one of the inlet ports 24. Line pressure within the diverter chamber, acting on the piston area defined by piston diameter D2, produces a resultant force tending to urge the piston member toward its inactive or retracted position as shown in FIG. 7. Thus, in some if not many circumstances the piston return force of the piston return spring may not be necessary. In such case the piston return spring 168 can be eliminated or may be included simply to provide a supplemental piston return actuating force.

To ensure precision positioning of the internal diverter seat or seal retainer member 132 with respect to the circular stationary seat ring member 102 for positive sealing at the actuated position of the diverter valve member 130, the cage-like diverter valve housing 127 is secured to the projecting connector stem 129 of an extension section 123 of the port selector piston member 156 as shown in FIG. 4A. The valve housing 127 is threaded or otherwise connected to the projecting connector stem 129 of the port selector piston member so that the valve housing and port selector piston are linearly moveable as a unit. Relative positioning of the valve housing 127 and the port selector piston for precision sealing engagement with one of the static inlet port seat members 132 is controlled by tolerances and dimensions of the components of the port selector piston member and the diverter valve housing.

Valve body 12 defines a test port 184 having an internally threaded section 186 that receives the externally threaded section 188 of a test and service plug member 190. The test and service plug member is sealed with respect to the valve body 12 by means of an annular seal member 192 that is contained within an internal annular seal groove 194. The test and service plug 190 is provided with a pressure test passage 196 having an internally threaded outer extremity 198 which receives a pressure test bleed fitting 200. The pressure test bleed fitting can be opened by the use of a simple wrench to bleed pressure from the diverter chamber 90 thus providing a pressure indication that one or more seal members may have become worn or damaged through use to the point that the sealing capability thereof has become deteriorated to the point that the sealing capability has been lost. The test and service plug 190 is also provided with a circular rim 197 having an internal cylindrical sealing surface 199 that is adapted to receive and establish sealing engagement with the seat member 132 at the nose or sealing end of the diverter valve member 130 when the diverter member 130 has been rotated to a test position in alignment with the test and service plug member 190. For service of the diverter valve member, including complete repair or replacement of the diverter valve member 127, the valve actuating piston member 156 and the piston actuator housing 142, the flow diverter member 64 is oriented with the diverter valve member 130 aligned with the test and service port and test plug member. The pressure bleed fitting is then opened to its bleed condition, permitting pressure within the diverter chamber 90 to be depleted. Assuming bleeding of pressure ceases, an indication is provided that the various pressure containing seals are in good working order. The test and service plug is then unthreaded from the valve body threads 186 and removed. The diverter valve member 130 can then be extracted by linear movement and can be repaired or replaced as necessary. Also, if needed, the actuator housing 142 can be unthreaded from the actuator chamber of the valve body and removed for service or replacement.

Testing of the sealing capability of the annular sealing members 94 and 96 of the tubular trunnion member 86 is accomplished by a bleed fitting 202 that is secured within an internally threaded section 204 of a pressure test passage 206 of the discharge section 38 at the lower end portion of the valve body 12. With the valve chamber 14 under pressure, and the discharge port 40 closed, the pressure test bleed fitting 202 is controllably opened, such as by means of a simple wrench. If the sealing capability of the annular seals 94 and 96 is good the pressure that is present between or below the seals will quickly diminish to zero, providing an indication that at least the lower seal 96 below the bearing 98 is capable of containing line pressure.

The hydraulic actuation mechanism of the present invention has several different modes of operation which may be employed selectively. A first mode of operation may be defined as "hydraulic actuation, hydraulic return". In this case hydraulic pressure is applied to a first piston chamber 170 and acts on a piston area D1 to move the piston member 156 in an actuating direction for moving the diverter valve member 130 into seated relation with a selected one of the flow port seat members 102. In this condition the diverter member cannot be rotated due to the extended and seated condition of the diverter valve member. When it is desired to unseat the diverter valve member 130 from the static seat ring 102 to enable rotation of the diverter member within the valve chamber 14, hydraulic pressure from the hydraulic pressure source is applied via hydraulic passages 235 and 236 to a hydraulic fluid passages 237 and 239 for application of hydraulic pressure to the return spring chamber for application of hydraulic pressure to return side of the piston member 156. Simultaneously, the hydraulic system will dissipate hydraulic pressure in the piston chamber 170. If a return spring 168 is provided, any fluid pressure within the diverter chamber 90 will act on piston area D1 and enhance the piston return force of hydraulic pressure acting on the return side of the piston member to move the diverter valve member 130 linearly to its retracted position.

A second mode of operation is defined as "hydraulic action, spring return". In this case the hydraulic piston is moved to its actuated position as indicated above, with hydraulic pressure being applied within the first piston chamber 170 to move the piston member to the left as shown in FIG. 4A. The compression return spring 168 is subjected to additional compression during this hydraulically actuated piston movement. For spring energized piston return movement, to the right as shown in FIG. 4A the hydraulic pressure within the first hydraulic chamber 170 is simply depleted, such as by opening of a hydraulic bleed valve in the hydraulic circuitry. As this happens the force of the loaded spring will return the hydraulic piston member and the diverter valve member 130 to their retracted positions, thus readying the diverter member 64 for rotation within the valve chamber 14.

Figures 8, 9:
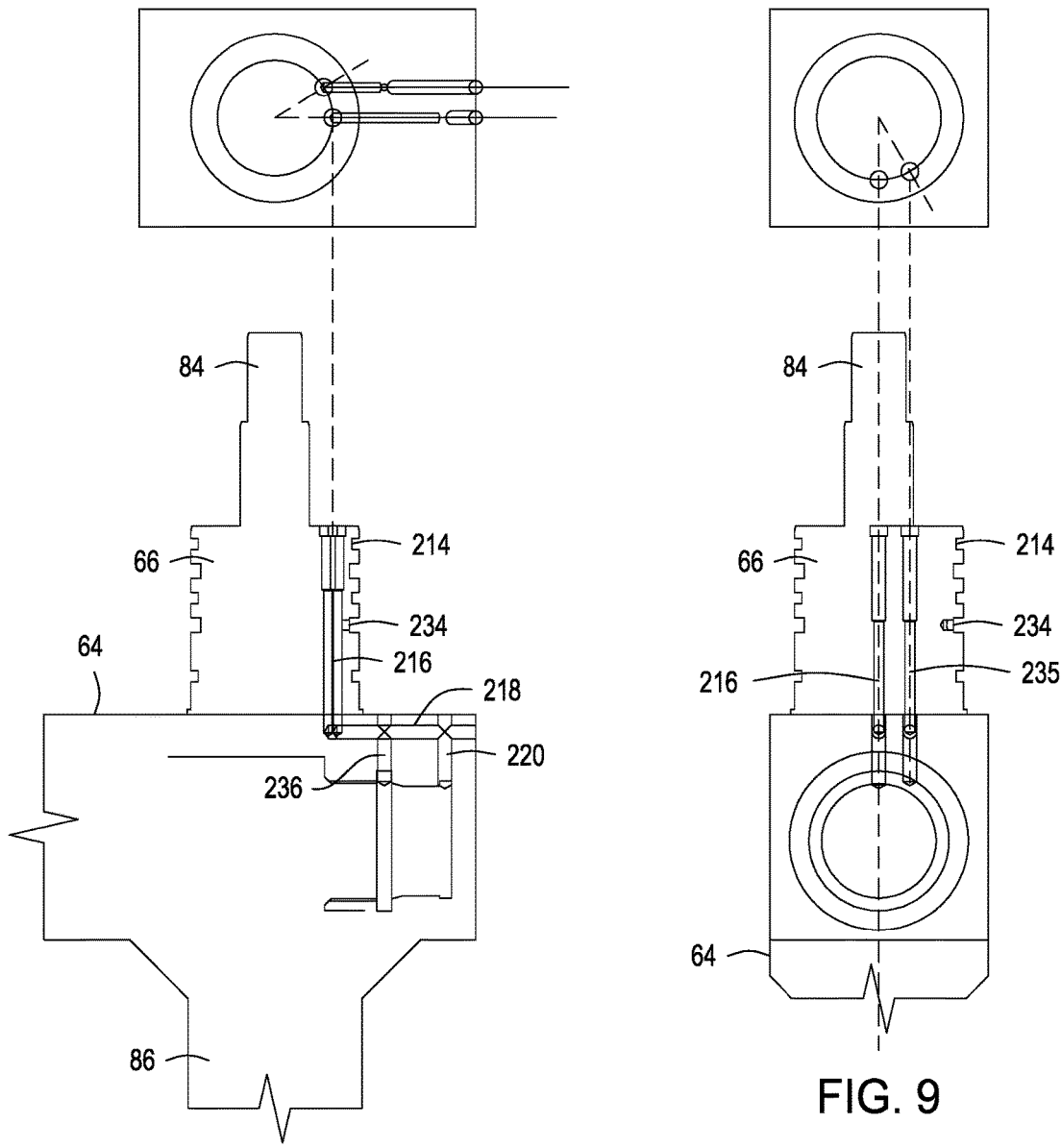

A third mode of operation is defined as "hydraulic actuation, diverter chamber pressure return". In this case the compression return spring 168 can be eliminated or its spring force can be employed in conjunction with hydraulic piston return actuation by the hydraulic pressure of fluid within the diverter chamber 90, which may also be termed "line pressure". Since diverter chamber pressure or line pressure is always present when the rotary diverter member is in operative engagement with the seat member of a selected inlet port, the port selector piston member can be returned to its retracted position simply by bleeding hydraulic pressure from the first hydraulic chamber 170. This condition permits diverter chamber or line pressure to act on the piston area D2 of the port selector piston member and develop a return force that moves the piston member to the right, to its retracted position as shown in FIG. 8. If the return spring 168 is present within the spring chamber 164, the spring force will simply augment the return force of line pressure actuation of the piston member.

As shown in FIG. 4A and in FIGS. 8 and 9, for piston operation by hydraulic or pneumatic pressure the bonnet member 18 defines a first hydraulic supply passage 208 that receives hydraulic pressure from a supply source 51 via a supply line 210. The first hydraulic supply passage 208 has an inner end portion 212 that is in communication with a first external annular groove 214 of the valve stem 66. A hydraulic supply passage 215 in the form of a bore intersects the inner end portion 212 of the supply passage 208 and conducts hydraulic pressure to a lateral hydraulic supply passage 218 and thence to a passage section 220 that is in communication with the piston chamber 170. A closure plug member 222 is threaded into the upper end portion of the hydraulic supply passage 215 to close the drilled opening of the supply passage. Annular seal members 224 and 226 provide sealing between the bonnet member 18 and valve stem 66 adjacent each side of the annular groove 214.

A second hydraulic fluid supply passage 228 is defined in the bonnet member 18 and receives hydraulic pressure from a source S2, such as a pump, by means of a supply line 230 that is connected with the bonnet member by means of a hydraulic supply fitting 232. An inner portion of the hydraulic fluid supply passage 228 is in fluid communication with an annular groove or channel 234 of the valve stem 66. The annular groove or channel 234 is in fluid communication via a generally vertical bore 235 with a hydraulic fluid supply passage 236 that is generally parallel with the supply passage 215. An annular external hydraulic pressure channel 235 is defined by the actuator housing 142 and is in communication with one or more hydraulic ports 239 in the actuator housing for delivery of hydraulic pressure to the spring chamber for return actuation of the piston member 156. The annular seal member 226 and an annular seal member 238 prevent hydraulic pressure leakage along the valve stem 66.

FIG. 8 is a diagrammatic elevation view showing only the diverter member 64 and emphasizing the hydraulic supply passage circuits for actuating the port selector piston member 156, shown in FIG. 10, to its extended position for positioning the connected diverter valve member 130 with its annular seat member 132 within and in sealing engagement with a selected one of the stationary seat members 102 and to its retracted position as shown in FIGS. 5 and 6. It is to be borne in mind that the hydraulic circuit passages for extended movement and retracting movement of the port selector piston member and not in fluid communication. Hydraulic pressure in either of the hydraulic circuit passages is controlled by appropriate selector valves of a hydraulic actuator mechanism.

FIG. 9 is a diagrammatic end elevation view showing the diverter member 64 and showing external pressure conducting annular external grooves or channels 214 and 234 in the valve stem 66 for conducting hydraulic fluid from hydraulic passages of the bonnet closure member 18 for hydraulic operation of the port selector piston member 156 to its extended and retracted positions.

FIG. 10 is a simplified or diagrammatic illustration of the rotary diverter member 64 of the rotary multi-port valve mechanism showing the valve stem and tubular trunnion members for controlling rotation of the diverter member within the valve chamber 14 and illustrating the extended positions of the port selector piston and diverter valve members.

FIG. 11 is a section view taken along line 11-11 of FIG. 10 and showing the flow controlling structure of the diverter valve member 130.

An indexing member 240 in the form of a ball detent is moveable within a detent receptacle 242 and is urged outwardly by a detent spring 244. The ball detent is received within detent receptacles 246, one being located adjacent each inlet port 24. The ball detent serves to provide a click stop for the flow diverter member 64 to ensure that the diverter member is stopped precisely at the selected inlet port location.

Operation

With the flow diverter valve member 130 in the retracted position shown in FIG. 6 and being aligned with the inlet port 24 and its stationary valve seat 102, hydraulic pressure is injected into the hydraulic or pneumatic piston chamber 170, thus applying an actuating force to the piston area D1, shown in FIG. 7, causing the piston member 156 to be moved to the left, overcoming the opposing force of the piston return spring 168, if the spring is present, and overcoming the piston return force that is developed by diverter chamber pressure, i.e. line pressure, acting on the reduced diameter piston area D2. This hydraulically or pneumatically energized piston movement, by the driving connection of the piston member with the diverter valve member 130, forces the diverter valve member 130 to the left, positioning its internal diverter nose seat or seal retainer member 132 within the cylindrical inner surface of the stationary seat member 132, causing the annular nose seal member 136 to establish sealing engagement with internal cylindrical surface 103 of the stationary seat member. The diverter valve member 130 is positioned relative to the piston member 156 such that the truncated annular internal corner 116 of the stationary seat ring is located in close proximity with the external rearwardly facing angulated surface 140 of the internal diverter seal retainer member 132, thus providing a small annular chamber 116 of generally triangular cross-section that is in communication with passages 112 of the static seat member 102. Pressure changes within the annular chamber 116 are detected by a pressure sensor 119 to ensure the viability of the seals of the static port seat member and the diverter valve member.

An annular sealing member 131, typically composed of a suitable polymer material such as urethane, is retained at the circular nose portion of the diverter valve member 130 by a retaining shoulder of a circular seat or seal retainer member 132. As the seal retainer member 132 and annular sealing member 131 are moved into sealing position with the annular stationary seat member 102 the external seal member 138 establishes sealing with the generally cylindrical internal sealing surface 103 and maintains this sealed relationship during movement and seating of the annular sealing member 131 with the annular seat ring member 102. Such seat movement is complete when the planar sealing surface 133 of the sealing member 131 establishes face-to-face sealing engagement with the annular generally planar sealing surface 105 of the stationary seat ring 102. This sealing arrangement establishes positive sealing with respect to the inlet port 34, excludes contaminants such as sand, line scale and other solid particulate from interfering with the sealing capability and durable sealing characteristics of the materials. The seal rings will isolate the seals from abrasion by sand and other particulate that may be entrained in the flowing fluid that passes through the diverter valve mechanism.

Assuming it is desired to terminate the fluid flow to the inlet port 24 of FIG. 6 and to initiate fluid flow through another one of the flanged inlet fittings 26 of the multi-port valve mechanism, fluid flow through the inlet port 24 continues during piston actuated retraction of the diverter valve from the inlet port to a protected position within the diverter chamber 90. Rotation of the diverter member to another selected position occurs with the valve body chamber 14 under pressure since each of the flow ports will be in pressure communication with the valve chamber during rotation of the diverter member. The fluid pressure within the diverter chamber 90, i.e., line pressure, is employed for piston return actuation, acting on piston area D2 to shift the piston member back to the starting or retracted position shown in FIG. 7 and moving the diverter valve member 130 to the retracted position shown in FIG. 6. With the port selector piston member and diverter valve member retracted as shown in FIG. 6, the rotary diverter valve member 64 is then free to be rotated to another selected inlet port, such as for permitting selected flow from a different well through the multi-port valve mechanism. Since the nose seals of the diverter valve member will be retracted to a position completely within the valve chamber of the diverter member prior to diverter rotation, the nose seal cannot contact any internal surface or structure of the valve body, thus protecting the nose seals from being damaged during diverter rotation. This diverter valve retraction also positions the nose seals in a position out of the flow path, thus ensuring that the nose seals do not become worn by sand and other particulate that is carried by the fluid being controlled by the valve mechanism. The valve actuator that is connected operationally with the diverter valve actuating stem 84 of the valve stem 66 is selectively actuated, rotating the diverter member 64 within the valve chamber until the ball detent 240 reaches a detent receptacle 246, thus applying a click stop to confirm alignment of the diverter valve member 130 with the selected inlet port. The operational cycle of the rotary multi-port valve mechanism will then be repeated for piston actuated movement of the diverter valve member linearly to a position engaging the nose seals of the diverter valve member with a selected inlet port to establish selective flow from another of the wells with which the rotary multi-port valve is connected.

If it becomes appropriate to test the sealing capability of the seals of the diverter valve member and thus determine any seal wear or damage, with the port selector piston member closed and sealed to one of the secondary flow ports and flows from the other inlet ports terminated, the pressure test plug 200 may be rotated to its vent position, thereby venting fluid pressure from the valve chamber 14. With the valve chamber 14 vented, any continuing flow of fluid, including liquid or gaseous material, will indicate that seal leakage is occurring. At that point, the multi-port valve mechanism may be scheduled for seal replacement. Seal inspection of this nature can be accomplished with the diverter chamber 90 under pressure and with the rotary diverter valve in operation, permitting fluid flow from a selected inlet port, through the rotary diverter member to the discharge port of the diverter member.

With reference to the embodiment shown in FIG. 4, the seals of the diverter valve member 130 can be replaced by removing the test plug member 190 from the test port 184 of the valve body, thus providing a piston extraction port that is sufficiently large to permit removal of the piston housing member and diverter valve member 130 from the diverter valve member 64. The diverter valve member 130 will be rotated 180° to the opposite position that is shown in FIG. 4, orienting the port sealing end or nose seals of the diverter valve member 130 in alignment with the test port 184. Service personnel will then extract the diverter valve member 130 by grasping it and moving it linearly through the test port. The seal members may then be replaced, after which the diverter valve member may be inserted through the test port 184 and positioned within the transversely oriented internal piston receptacle 120 of the flow diverter member 64. With the test plug member 190 replaced within the test port and its vent passage 196 closed by the plug member 198, the multi-port valve mechanism can be pressure tested by double block and bleed testing to confirm the sealing integrity of the replaced seals, after which the multi-port valve mechanism can be hydraulically actuated to its sealing position, restoring the diverter valve mechanism to service.

According to the embodiments of FIGS. 4-6 replacement of the seal ring 132 and any other seals of the sealing end of the diverter valve member 130 may be accomplished while permitting the piston housing structure 142 to remain seated within the transversely oriented internal piston receptacle 150 of the rotary diverter valve member 130. This feature permits the external cylindrical surface portions of the piston housing to be maintained in sealing engagement within the transversely oriented internal piston receptacle 150, thus ensuring that the hydraulic fluid passages and chamber remain isolated from the piston receptacle, and preventing the loss of hydraulic fluid during seal maintenance. With the test plug 190 removed from the test port 184, maintenance personnel will unthread the adjustment connection 180-182 to separate the port selector piston member 156 from the diverter valve member 130, permitting remove of the diverter valve member through the test port. A replacement seal ring 132 may then be installed to the diverter valve member. With fresh seals installed or having a seal ring having a molded face seal installed will restore sealing capability to the seat ring 132. The restored diverter valve member 130 will then be inserted through the test port and assembled with the port selector piston member.

In the event the internal stationary seal member 102 should require seal replacement or other repair, the bonnet closure member 18 must be removed from the valve body and the rotary diverter member 64 must be removed from the valve chamber 14. Service personnel, working within the open valve chamber will use a grapple device to engage the internal groove 132 of the seat ring 102 and apply sufficient pulling force to extract the stationary seal ring from its receptacle 104. A replacement seat ring assembly or the seat ring with its seals restored will then be press-fitted within the seal receptacle 104.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A rotary multi-port valve mechanism, comprising:
a valve body defining a valve chamber and having a plurality of inlet flow ports each having a substantially stationary seat member located therein;
a discharge port being defined by said valve body;
a flow diverter member being supported for rotation within said valve chamber and defining a diverter chamber in fluid communication with a selected one of said inlet flow ports and said discharge flow port;
a diverter valve member having annular nose seals being linearly moveable within said flow diverter member and having a sealing end being linearly moveable within said flow diverter member and having a sealing end supporting a seal member disposed for sealing engagement with said stationary seat member, said diverter valve member being selectively movable to a retracted position completely within said valve chamber permitting selective rotation of said flow diverter member within said valve chamber to an aligned position with a selected one of said plurality of inlet ports;
a port selector piston member having driving connection with said diverter valve member and being selectively moveable within said diverter valve member by hydraulic pressure to a sealing position locating said diverter valve member in sealing engagement with a selected one of said stationary seat members and to a retracted position locating said diverter valve member and said annular nose seals at a protected position within said valve chamber permitting selective rotation of said flow diverter member within said valve chamber and protecting said diverter valve member and said annular nose seals from contact with said valve body during rotation of said diverter valve member within said valve chamber;
a piston chamber being located within said flow diverter member;
a first hydraulic fluid supply being selectively conducted to said piston chamber and applying hydraulic pressure to a first pressure responsive surface area of said port selector piston member and moving said port selector piston member to said sealing position establishing sealing engagement of said diverter valve member with said stationary seat member; and
a second hydraulic fluid supply a being selectively conducted to said piston chamber and applying hydraulic pressure to a second pressure responsive surface area of said port selector piston member and returning said port selector piston member to said retracted position.

2. The rotary multi-port valve mechanism of claim 1, comprising:
said diverter valve member having a tubular valve housing defining a circular nose having a seal mount supporting an annular seal member and having a wear resistant sealing member defining an annular generally planar sealing surface;
an annular seat member being mounted to said seal mount and at the sealing position of said diverter valve member said annular seal member being received within and in sealing engagement with said stationary seat member; and
said stationary seat member having a generally planar sealing surface being engaged in face to face sealing relation by said wear resistant sealing member.

3. The rotary multi-port valve mechanism of claim 1, comprising:
said flow diverter member having a fluid flow chamber being in communication with a selected one of said inlet ports and thus having line pressure therein; and
said line pressure acting on a third pressure responsive area of said port selector piston member and developing a pressure responsive force urging said port selector piston member in a direction returning said port selector piston member to said retracted position.

4. The rotary multi-port valve mechanism of claim 1, comprising:
a spring chamber being defined within said piston housing;
a piston return spring being located within said spring chamber and being compressed by hydraulic pressure induced force and storing spring energy during linear movement of said port selector piston member toward said active position; and
a hydraulic piston actuator system developing said hydraulic pressure induced force moving said port selector piston member linearly to a sealing position locating said sealing end in sealing engagement with a sealing surface of a selected flow port, said piston return spring being compressed and storing spring energy during hydraulic pressure induced linear movement of said port selector piston member toward a selected inlet flow port, upon reduction of hydraulic pressure action on said first pressure responsive piston surface said stored spring energy moving said port selector piston member linearly away from the selected inlet flow port retracting said diverter valve seat from sealing engagement with said selected flow port and freeing said diverter member for selective rotation within said valve chamber.

5. The rotary multi-port valve mechanism of claim 1, comprising:
said port selector piston member having a first piston seal member defining first and second pressure responsive areas and having a second piston seal member defining a third pressure responsive area of said port selector piston member being exposed to fluid pressure within said diverter chamber for movement of said port selector piston member toward a retracted position upon depletion of hydraulic pressure to said first pressure responsive area; and
a hydraulic fluid supply system defining first and second fluid conducting passages selectively conducting hydraulic pressure to said first and second pressure responsive areas for selective movement of said port selector piston member.

6. The rotary multi-port valve mechanism of claim 1, comprising:
a bonnet closure member being mounted in sealed relation with said valve body
a hydraulic power system being defined within said bonnet closure member and having selective hydraulic fluid pressure input for selectively controlled piston operation; and
said hydraulic power system communicating hydraulic fluid pressure to a pressure responsive area of said port selector piston member and upon being activated developing a hydraulic pressure responsive force moving said port selector piston member linearly toward a selected secondary flow port.

7. The rotary multi-port valve mechanism of claim 1, comprising:
 a diverter valve member being moveable within said flow diverter member and being connected in driven relation with said port selector piston member;
 a flow controlling seat member being mounted to said diverter valve member and having an annular seal; and
 for selected inlet port flow control said diverter valve member being positioned by said port selector piston member with said flow controlling seat member in sealing engagement with said stationary seat member.

8. The rotary multi-port valve mechanism of claim 6, comprising:
 said stationary seat member being of substantially circular configuration defining a generally cylindrical inner sealing surface and having an internal pressure rise detection passage having a pressure sensing opening;
 said valve body having a pressure sensor and defining a pressure sensor and defining a pressure sensor chamber being in communication with said pressure sensing opening of said stationary seat member and detecting pressure rise from any seal leakage;
 said flow controlling seat member being mounted in substantially fixed relation to an end portion of said diverter valve member and being positioned at least partially within and in sealing relation with said generally cylindrical inner sealing surface;
 a pressure cavity being defined in said valve body and receiving said pressure sensor for leak detection and leakage control.

9. The rotary multi-port valve mechanism of claim 1, comprising:
 a tubular trunnion member extending downwardly from said rotary diverter member and having an end portion thereof in bearing supported and sealed rotary moveable relation within said valve body; and
 a flow passage being defined within said tubular trunnion member and being in fluid communication with said discharge flow port.

10. The rotary multi-port valve mechanism of claim 1, comprising:
 a bonnet member being secured in sealed relation with said valve body and forming a closure for said valve chamber;
 a diverter stem projecting from said diverter member and extending in sealed relation through said bonnet member; and
 a bearing member being positioned about said valve diverter stem and facilitating rotation of said valve diverter stem and rotation of said rotary valve diverter member within said valve chamber.

11. The rotary multi-port valve mechanism of claim 1, comprising:
 a plurality of detent recesses being defined within said valve body each detent recess being located for mechanically positioning said diverter valve member and said port selector piston member in alignment with a selected one of said selected inlet flow ports; and
 a spring urged detent member being supported by said diverter member and establishing positioning engagement with a selected one of said detent recesses and representing a position stop member for said diverter member.

12. The rotary multi-port valve mechanism of claim 1, comprising:
 a test port being defined by said valve body and being of sufficiently large dimension to permit movement of said piston housing member and said diverter valve member therethrough;
 a test plug normally closing said test port and being removable when repair or replacement of said port selector piston member is desired;
 a pressure test passage being defined in said test plug; and
 a pressure test and pressure relief fitting being mounted to said test plug at said pressure test passage and being opened for block and bleed type detection of the sealing integrity of the seals of said port selector piston member;
 a circular sealing rim extending from said test plug and defining a seal testing recess having circular internal sealing surface; and
 said sealing end of said port selector piston member being received in sealing engagement with said circular internal sealing surface and facilitating block and bleed testing of piston seals without requiring removal of said test plug from said valve body.

13. A rotary multi-port valve mechanism, comprising:
 a valve body defining a valve chamber and having a discharge flow port and a plurality of entry flow ports each having an internal stationary seat member, said valve body further defining a test port being normally closed by a removable test plug;
 a rotary flow diverter member being supported for rotation within said valve chamber and defining fluid chamber in communication with said valve chamber and said discharge flow port;
 a piston housing being located in substantially fixed relation within said rotary flow diverter member and defining an internal piston sealing surface;
 a diverter valve member having driven connection with said port selector piston member and having a seal member disposed for sealing engagement with a selected one of said stationary seat members upon piston urged movement of said diverter valve member to a sealing position with respect to a selected one of said plurality of inlet ports;
 a hydraulic pressure supply system having first and second supply passages being in fluid communication with said piston housing and causing selective movement of said port selector piston member to said sealing position and to a retracted position;
 a port selector piston member being linearly moveable within said piston housing and defining first and second pressure responsive areas and being selectively moveable within said piston housing by said hydraulic pressure supply system, said piston member having driving connection with said diverter valve member; and
 said piston housing member and said diverter valve member being removable from said rotary diverter member and moveable through said test port for repair or replacement after removal of said test plug from said valve body.

14. The rotary multi-port valve mechanism of claim 13, comprising:
 said diverter valve member having a ported tubular section being disposed in moveable sealed relation within said rotary flow diverter member;
 a diverter seal member being mounted to said diverter valve member and having an external seal ring being disposed in sealing engagement within said stationary seat member of a selected one of said inlet ports when said diverter valve member has been moved to said sealed position; and said port selector piston member and said diverter valve member having an adjustable connection permitting precision adjustment of the position of said diverter valve member relative to said stationary seat member at said actuated position of said diverter valve member.

15. The rotary multi-port valve mechanism of claim 13, comprising:

a bonnet closure member being mounted in sealed relation with said valve body;

a valve stem projecting from said rotary diverter member and extending in sealed relation through said bonnet closure member;

a tubular trunnion member extending downwardly from said rotary diverter member and having an end portion thereof in bearing supported and sealed rotary moveable relation within said valve body; a flow passage being defined within said tubular trunnion member and being in fluid communication with said primary flow port; a bonnet member being secured in sealed relation with said valve body and forming a closure for said valve chamber;

a valve diverter stem projecting from said rotary diverter member and extending in sealed relation through said bonnet member; and a bearing member being positioned about said valve diverter stem and facilitating rotation of said rotary valve diverter member within said valve chamber.

16. The rotary multi-port valve mechanism of claim 13, comprising:

said piston member a first piston seal member defining first and second pressure responsive areas;

a hydraulic fluid supply system defining first and second fluid conducting passages selectively conducting hydraulic pressure to said first and second pressure responsive areas for selective movement of said piston member; and said port selector piston member defining a third pressure responsive area being responsive to valve chamber pressure for movement of said port selector piston member toward a retracted position upon cessation of hydraulic pressure to said first pressure responsive area.

17. The rotary multi-port valve mechanism of claim 13, comprising:

a diverter valve member being moveable within said flow diverter member and being connected in driven relation with said port selector piston member;

a flow controlling seat member being mounted to said diverter valve member and having an annular seal;

for selected inlet port flow control said diverter valve member being positioned by said piston member with said flow controlling seat member in sealing engagement with said stationary seat member;

a bonnet closure member being mounted in sealed relation with said valve body;

a hydraulic power system being defined within said bonnet closure member and having selective hydraulic fluid pressure input for selectively controlled piston operation; and said hydraulic power system being a hydraulic power system communicating hydraulic fluid pressure to a pressure responsive area of said piston member and upon being activated moving said piston member linearly toward a selected secondary flow port.

18. The rotary multi-port valve mechanism of claim 17, comprising:

a hydraulic fluid power system being defined by said bonnet closure member of said valve body and being in communication with a piston chamber of said diverter valve member; said piston member having opposed pressure responsive areas being selectively exposed to hydraulic fluid pressure of said hydraulic fluid power system and being hydraulically moveable in a direction engaging said seat member thereof with a stationary seat member of a selected inlet port; and a piston return spring within said piston chamber being compressed and storing spring energy during hydraulic movement of said piston member toward said actuated position; and upon controlled dissipation of hydraulic pressure said stored spring energy returning said port selector piston member to a position within said valve chamber freeing said diverter member for rotation within said valve body.

* * * * *